US010803159B2

(12) United States Patent
Kim et al.

(10) Patent No.: US 10,803,159 B2
(45) Date of Patent: Oct. 13, 2020

(54) ELECTRONIC DEVICE AND METHOD FOR CONTROLLING THE SAME

(71) Applicant: LG ELECTRONICS INC., Seoul (KR)

(72) Inventors: Kokeun Kim, Seoul (KR); Shinjae Kang, Seoul (KR); Sungjin Kim, Seoul (KR); Sooyoung Sim, Seoul (KR); Seheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 16/116,790

(22) Filed: Aug. 29, 2018

(65) Prior Publication Data

US 2019/0347390 A1    Nov. 14, 2019

(30) Foreign Application Priority Data

May 14, 2018    (KR) .......................... 10-2018-0055141

(51) Int. Cl.
G06F 21/00    (2013.01)
G06F 21/32    (2013.01)
G06N 7/00    (2006.01)

(52) U.S. Cl.
CPC .............. *G06F 21/32* (2013.01); *G06N 7/005* (2013.01)

(58) Field of Classification Search
CPC ............................ G06F 21/32; H04L 63/0861
(Continued)

(56) References Cited

U.S. PATENT DOCUMENTS 7,505,613 B2 * 3/2009 Russo ................ G06K 9/00114
340/5.53
10,586,031 B2 * 3/2020 Andersson ......... G06K 9/00892
(Continued)

FOREIGN PATENT DOCUMENTS

KR    1020060009062    1/2006
KR    1020110090731    8/2011
(Continued)

OTHER PUBLICATIONS

Korean Intellectual Property Office Application No. 10-2018-0055141, Office Action dated Jul. 9, 2019, 8 pages.
(Continued)

*Primary Examiner* — Longbit Chai
(74) *Attorney, Agent, or Firm* — Lee, Hong, Degerman, Kang & Waimey PC

(57) ABSTRACT

The present disclosure relates to an electronic device capable of performing complex biometric authentication, and the electronic device may include a plurality of biometric sensors configured to sense different biometric information, a security module configured to calculate a matching score for each of the different biometric information through a comparison between the different biometric information and previously registered user information, and calculate fake probability information for each of the different biometric information in consideration of a fake factor of the different biometric information, and perform user authentication using the matching score and the fake probability information calculated for each of the different biometric information, and a controller configured to control the electronic device based on a user authentication result performed by the security module.

25 Claims, 8 Drawing Sheets

(58) Field of Classification Search
USPC .......................................................... 726/19
See application file for complete search history.

(56) References Cited

U.S. PATENT DOCUMENTS

| | | |
|---|---|---|
| 2007/0003110 A1 | 1/2007 | Gutta et al. |
| 2013/0267204 A1 | 10/2013 | Schultz et al. |
| 2016/0070968 A1 | 3/2016 | Gu et al. |
| 2016/0132735 A1 | 5/2016 | Derakhshani et al. |

FOREIGN PATENT DOCUMENTS

| | | |
|---|---|---|
| KR | 1020130088439 | 8/2013 |
| KR | 1020160040037 | 4/2016 |
| WO | 2013188039 | 12/2013 |

OTHER PUBLICATIONS

PCT International Application No. PCT/KR2018/011492, Notification of Transmittal of the International Search Report and the Written Opinion of the International Searching Authority, or Declaration dated Jan. 31, 2019, 17 pages.

\* cited by examiner

ELECTRONIC DEVICE AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2018-0055141, filed on May 14, 2018, the contents of which are hereby incorporated by reference herein in its entirety.

BACKGROUND OF THE INVENTION

1. Field of the Invention

The present disclosure relates to an electronic device capable of performing complex biometric authentication.

2. Description of the Related Art

With the development of technology, the functions of electronic devices are diversified. For example, the functions may include data and voice communication, photographing and video shooting through a camera, voice recording, playing a music file through a speaker system, and displaying an image or video on a display unit. Some electronic devices further include an electronic game play function or perform a multimedia player function. In particular, in recent years, electronic devices may receive multicast signals that provide visual content such as broadcast, video or television programs.

As it becomes multifunctional, an electronic device may be allowed to capture still images or moving images, play music or video files, play games, receive broadcast and the like, so as to be implemented as an integrated multimedia player.

In order to support and enhance the functions of the electronic device, the improvement of structural or software elements of the terminal may be taken into consideration.

As the functions of electronic devices are diversified, the importance of user authentication for security enhancement has increased. Various methods such as a password method, a pattern method, and a biometric method may be used for user authentication.

As a method of security authentication, biometrics is a technology that performs user authentication using unique physical characteristics such as a user's fingerprint, face, voice, iris, retina, blood vessels, or the like. Such biometrics technology is less susceptible to theft or imitation, and is highly usable.

On the other hand, in recent years, in order to enhance security, technological advances have been made from unimodal biometrics that performs biometric authentication using a single biometric information to multimodal biometrics that performs biometric authentication using a plurality of biometric information.

In implementing such multimodal biometric authentication technology, it is required to develop various methods that utilize a plurality of biometric information. In the present disclosure, a method of performing biometric authentication using a plurality of biometric information is proposed.

SUMMARY OF THE INVENTION

An object of the present invention is to implement an electronic device capable of performing complex biometric authentication.

Furthermore, another object of the present disclosure is to improve the authentication accuracy of the complex biometric authentication.

The present disclosure relates to an electronic device capable of performing complex biometric authentication, and the electronic device may include a plurality of biometric sensors configured to sense different biometric information, a security module configured to calculate a matching score for each of the different biometric information through a comparison between the different biometric information and previously registered user information, and calculate fake probability information for each of the different biometric information in consideration of a fake factor of the different biometric information, and perform user authentication using the matching score and the fake probability information calculated for each of the different biometric information, and a controller configured to control the electronic device based on a user authentication result performed by the security module.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
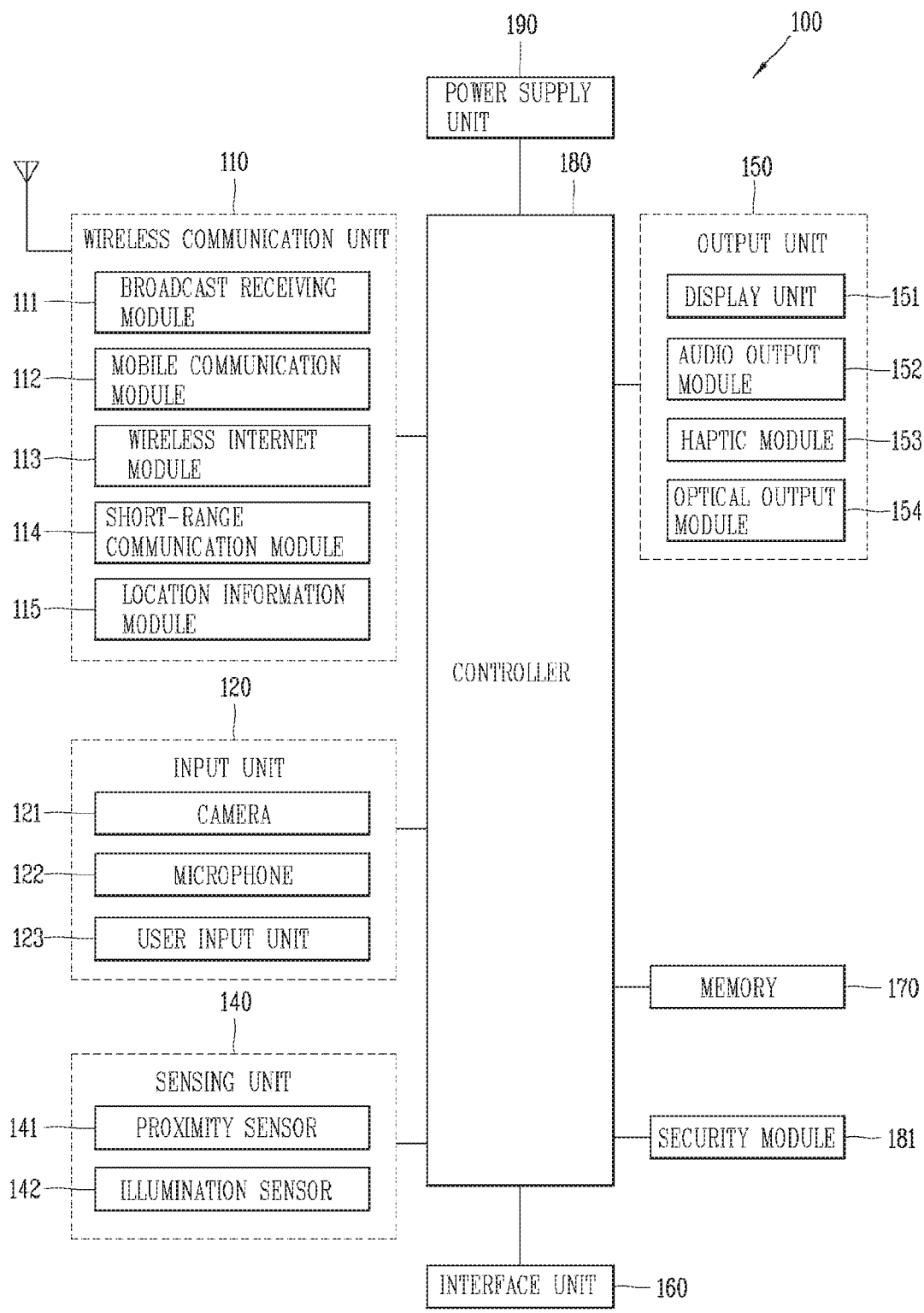
FIG. 1 is a block diagram for explaining an electronic device related to the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Portable electronic devices described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), smart vehicles and the like.

However, it may be easily understood by those skilled in the art that the configuration according to the exemplary embodiments of this specification can also be applied to stationary terminals such as digital TV, desktop computers and the like, excluding a case of being applicable only to the electronic devices.

FIG. 1 is a block diagram for explaining an electronic device related to the present disclosure.

Referring to FIG. 1, the electronic device may include an input unit 120, a sensing unit 140, an output unit 150, an interface unit 160, a memory 170, a controller 180, a security module 181, and a power supply unit 190, and the like. The components shown in FIG. 1 are not essential for implementing an electronic device, and thus the electronic device described herein may have more or fewer components than those listed above.

In more detail, the wireless communication unit 110 of those components may typically include one or more modules which permit wireless communications between the electronic device 100 and a wireless communication system, between the electronic device 100 and another electronic device 100, or between the electronic device 100 and an external server. In addition, the wireless communication unit 110 may include one or more modules for connecting the electronic device 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of information within the electronic device, surrounding environmental information of the electronic device, and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The biometric sensor 143 may include an iris sensor, a face recognition sensor, a PPG sensor, a voice sensor, and the like. On the other hand, the electronic device 100 disclosed herein may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the electronic device 100 and a user, as well as functioning as the user input unit 123 which provides an input interface between the electronic device 100 and the user.

The interface unit 160 may serve as an interface with various types of external devices connected with the electronic device 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The electronic device 100 may execute an appropriate control associated with a connected external device, in response to the external device being connected to the interface unit 160.

In addition, the memory 170 stores data that support various functions of the electronic device 100. The memory 170 is typically implemented to store data to support various functions or features of the electronic device 100. For instance, the memory 170 may be configured to store application programs executed in the electronic device 100, data or instructions for operations of the electronic device 100, and the like. At least some of those application programs may be downloaded from an external server via wireless communication. Some others of those application programs may be installed within the electronic device 100 at the time of being shipped for basic functions of the electronic device 100 (for example, receiving a call, placing a call, receiving a message, sending a message, etc.). On the other hand, the application programs may be stored in the memory 170, installed in the electronic device 100, and executed by the controller 180 to perform an operation (or a function) of the electronic device 100.

The controller 180 may typically control an overall operation of the electronic device 100 in addition to the operations associated with the application programs. The controller 180 may provide or process information or functions appropriate for a user by processing signals, data, information and the like, which are input or output by the various components depicted in FIG. 1A, or activating application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the electronic device 100 for operation.

The power supply unit 190 may receive external power or internal power and supply appropriate power required for operating respective elements and components included in the electronic device 100 under the control of the controller 180. The power supply unit 190 may include a battery, and the battery may be an embedded battery or a replaceable battery.

At least part of those elements and components may be combined to implement operation and control of the terminal or a control method of the electronic device according to various exemplary embodiments described herein. Furthermore, the operation and control or the control method of the portable electronic device may be implemented in the portable electronic device in such a manner of activating at least one application program stored in the memory 170.

Hereinafter, each aforementioned component will be described in more detail with reference to FIG. 1A, prior to explaining various exemplary embodiments implemented by the electronic device 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 means a module for supporting wireless Internet access. The wireless Internet module 113 may be built-in or externally installed to the electronic device 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the electronic device 100 and a wireless communication system, between the electronic device 100 and another electronic device 100, or between the electronic device and a network where another electronic device (or an external server) is located, via wireless personal area networks. The short-range communication module 114 denotes a module for short-range communications.

Here, another electronic device may be a wearable device, for example, a smart watch, a smart glass or a head mounted display (HMD), which is able to exchange data with the electronic device 100 (or otherwise cooperate with the electronic device 100). The short-range communication module 114 may sense (recognize) a wearable device, which is able to communicate with the electronic device 100, near the electronic device 100. In addition, when the sensed wearable device is a device which is authenticated to communicate with the electronic device 100 according to the present disclosure, the controller 180 may transmit at least part of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to detect, calculate, derive or otherwise identify a position of the electronic device. As an example, the location information module 115 includes a Global Position System (GPS) module, a WiFi module, or both. For example, when the electronic device uses the GPS module, a position of the electronic device may be acquired using a signal sent from a GPS satellite. As another example, when the electronic device uses the Wi-Fi module, a position of the electronic device may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the electronic device. As a module used to acquire the location (or current location) of the electronic device, the location information module 115 may not be necessarily limited to a module for directly calculating or acquiring the location of the electronic device.

Next, the input unit 120 may be configured to provide an audio or video signal (or information) input to the electronic device or information input by a user to the electronic device. For the input of the audio information, the electronic device 100 may include one or a plurality of cameras 121. The camera 121 processes a image frame, such as still picture or video, acquired by an image sensor in a video phone call or image capturing mode. The processed image frames may be displayed on the display unit 151. On the other hand, the plurality of cameras 121 disposed in the electronic device 100 may be arranged in a matrix configuration. By use of the cameras 121 having the matrix configuration, a plurality of image information having various angles or focal points may be input into the electronic device 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the electronic device 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the electronic device 100 to correspond to the input information. The user input unit 123 may include a mechanical input element (or a mechanical key, for example, a button, a dome switch, a jog wheel, a jog switch or the like located on a front/rear surface or a side surface of the electronic device 100), and a touch-sensitive input element. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the electronic device, surrounding environment information of the electronic device and user information, and generate a sensing signal corresponding thereto. The controller 180 may control an operation of the electronic device 100 or execute data processing, a function or an operation associated with an application program installed in the electronic device 100 based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the electronic device 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the electronic device 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. On the other hands, the controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may display (output) information processed in the electronic device 100. For example, the display unit 151 may display execution screen information of an application program driven in the electronic device 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the electronic device 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. The haptic module 153 may be implemented in two or more in number according to the configuration of the electronic device 100.

An optical output module 154 may output a signal for indicating an event generation using the light of a light source of the electronic device 100. Examples of events generated in the electronic device 100 may include a message reception, a call signal reception, a missed call, an alarm, a schedule notice, an email reception, an information reception through an application, and the like.

A signal output by the optical output module 154 may be implemented in such a manner that the electronic device emits monochromatic light or light with a plurality of colors. The signal output may be terminated as the electronic device senses a user's event checking.

The interface unit 160 serves as an interface for external devices to be connected with the electronic device 100. For example, the interface unit 160 can receive data transmitted from an external device, receive power to transfer to elements and components within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the electronic device 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the electronic device 100 via the interface unit 160.

Also, the interface unit 160 may serve as a path for power to be supplied from an external cradle to the electronic device 100 when the electronic device 100 is connected to the external cradle or as a path for transferring various command signals inputted from the cradle by a user to the electronic device 100. Such various command signals or power inputted from the cradle may operate as signals for recognizing that the electronic device 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the electronic device 100 may operate a web storage which performs the storage function of the memory 170 on the Internet.

As aforementioned, the controller 180 may typically control the general operations of the electronic device 100. For example, the controller 180 may set or release a lock state for restricting a user from inputting a control command with respect to applications when a state of the electronic device meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the electronic device 100.

The security module 181 controls an operation related security among the operations of the electronic device. For example, when a biometric authentication function is executed, the security module 181 may perform control related to biometric authentication. For example, the security module 181 may perform biometric authentication using an artificial neural network algorithm or an SVM algorithm, which is an algorithm for biometric authentication. In addition, the security module 181 may perform an algorithmic operation, such as Fuzzy logic, Dempster-Shafer theory, SVM, relevance vector machine (RVM) mean rule, Monte Carlo approach, phase stretch transform (PST), neural network, principal component analysis, Fisherfaces, Wavelet and Elastic Matching, or the like, which is an algorithm for biometric authentication.

The security module 181 may communicate with the controller 180 to transmit and receive data, thereby controlling an overall operation of the electronic device. For example, the controller 180 may receive user authentication result data from the security module 181 and control an operation of the electronic device based on the received data. In addition, the security module 181 may receive a control command for performing biometric authentication from the controller 180, thereby performing biometric authentication.

On the other hand, in FIG. 1, the security module 181 and the controller 180 are illustrated as being separate components, but the present disclosure is not limited thereto, and the security module 181 may be configured as one component of the controller 180.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Figure 2:
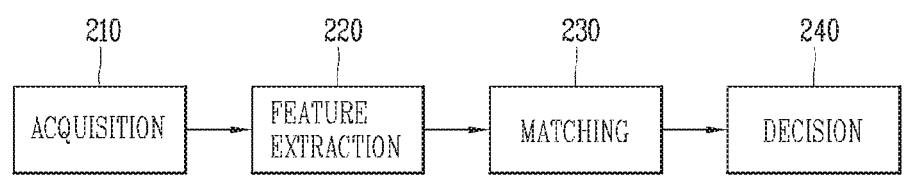
FIG. 2 is a conceptual view illustrating a single biometric authentication method.

Hereinafter, a method of performing biometric authentication in the electronic device described in FIG. 1 will be described in detail. FIG. 2 is a conceptual view illustrating a single biometric authentication method.

Referring to FIG. 2, single biometric authentication may include the steps of acquisition 210, feature extraction 220, matching 230 and decision 240.

In the acquisition step 210, biometric information may be acquired through a biometric sensor. The biometric information may include a user's own biometric information such as fingerprint, face, voice, vein, iris, and the like.

In the feature extraction step 220, the features of the biometric information may be extracted. The feature is information capable of recognizing the unique characteristic of each person. For example, in the case of a fingerprint, a point representing a specific shape of the fingerprint may be set as a feature. These features are set differently for each biometric authentication method.

In the matching step 230, a matching score between previously registered user information and sensed biometric information may be calculated. The previously registered user information is biometric information stored in advance by a user prior to performing biometric authentication. The user store fingerprint information, face information, voice information, vein information, iris information, and the like in advance in the memory 170 in a templet shape.

The matching score indicates a similarity between the previously registered user information and the biometric information. Various algorithms previously known in the related art may be used as an algorithm for calculating matching scores.

In the decision step 240, user authentication may be carried out using the matching score and the decision function. The decision function is a function that determines whether a user who enters biometric information is a genuine user or an imposter user. The decision function may be set to a specific threshold value, or may be set to a multi-dimensional function.

The decision function may be set to an initial setting value (default) by a manufacturer of a biometric authentication function. Furthermore, the decision function may change the initial setting value using the user's biometric information sensed through the biometric sensor. Accordingly, the electronic device may improve the speed and accuracy of biometric recognition as a lot of biometric operations are carried out.

In addition, the decision function may be generated differently according to information used to generate the decision function. Moreover, the differently generated decision function may be stored in the memory 170 in a plurality of ways. For example, the decision function may be generated with only a matching score, or may be generated using a matching score and a spoofing score. In this case, both of the decision functions may be stored in the memory 170, and biometric authentication may be carried out using any one of the decision functions as needed.

A single biometric authentication method has been described above. Hereinafter, a complex biometric authentication method will be described. FIGS. 3A through 3D are conceptual views illustrating a complex biometric authentication method.

Complex biometric authentication may be divided into four types according to the time of fusioning a plurality of biometric information. Here, fusion refers to an operation of combining a plurality of information according to a preset algorithm to generate one information, and may be used in terms of coupling, combination, fusion, and matching.

Figure 3A:
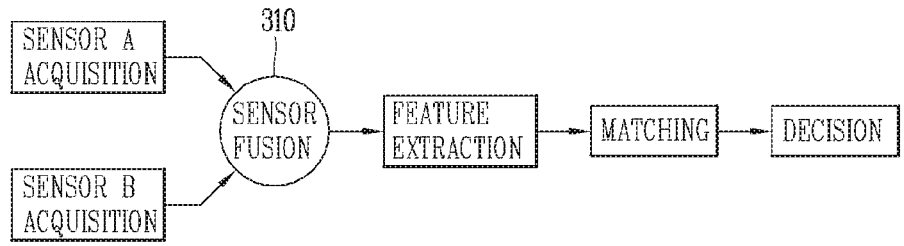
FIGS. 3A through 3D are conceptual views illustrating a complex biometric authentication method.

FIG. 3A has shown a sensor fusion method 310. The sensor fusion method 310 is a method of combining a plurality of biometric information acquired from different sensors in the step of acquiring biometric information. Specifically, the sensor fusion method is a method of fusioning biometric information sensed by different biometric sensors and extracting features from the fusioned information.

Figure 3B:
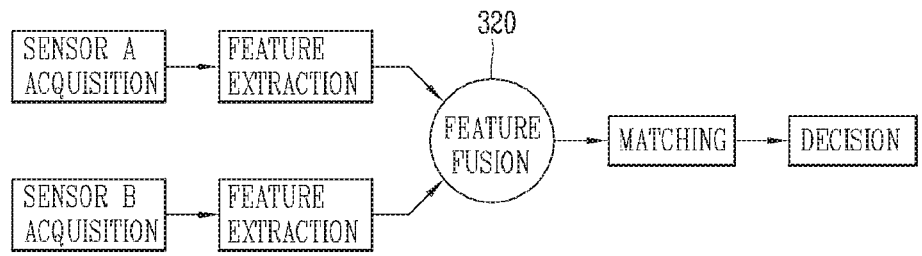

FIG. 3B has shown a feature fusion method 320. The feature fusion method 320 is a method of respectively extracting feature from a plurality of biometric information acquired from different biometric sensors in the step of extracting the features of biometric information, and combining the respectively extracted features.

Figure 3C:
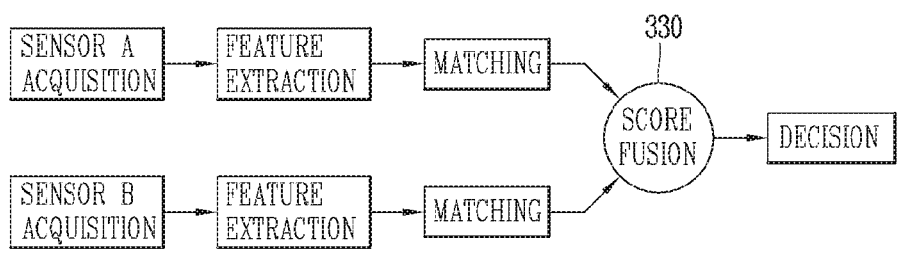

FIG. 3C has shown a score fusion method 330. The score fusion method 330 is a method of combining matching scores calculated for each of the plurality of biometric information in the step of matching biometric information.

Figure 3D:
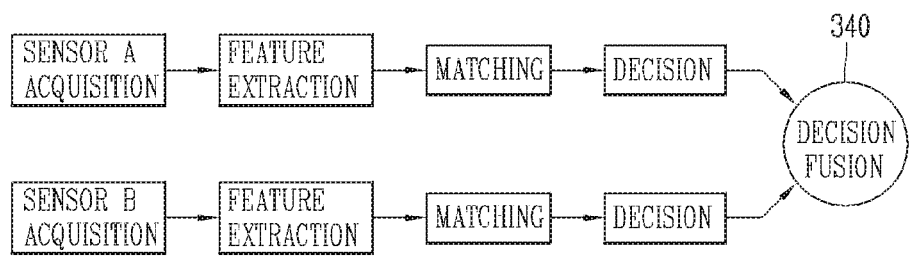

FIG. 3D has shown a decision fusion method 340. The decision fusion method 340 is a method of combining decision results calculated for each of the plurality of biometric information in the step of determining biometric information.

Figure 4A:
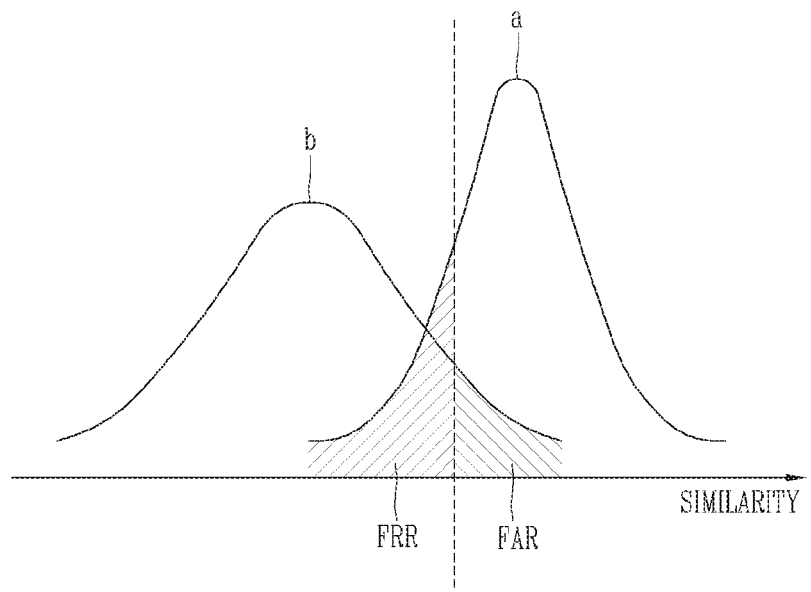
FIGS. 4A and 4B are graphs related to an error rate of a biometric authentication determination.
Figure 4B:
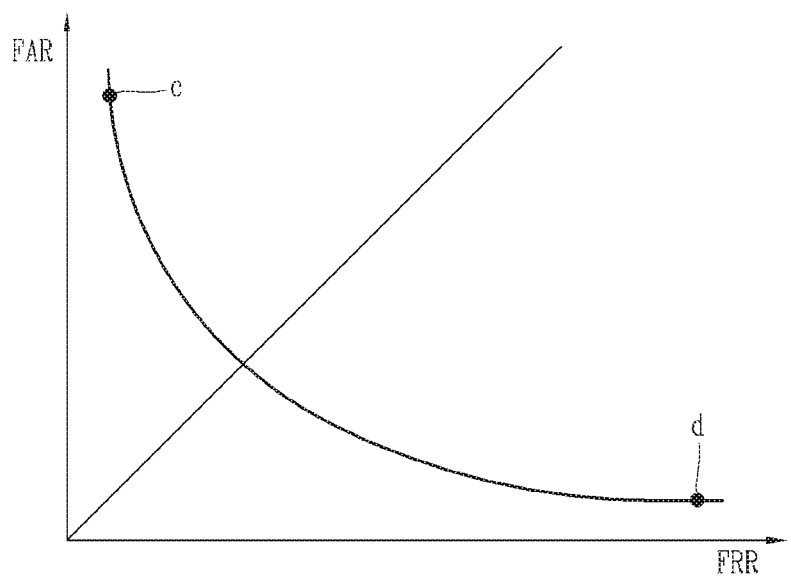

Various methods of complex biometric authentication have been described above. Hereinafter, an error rate of biometrics related to a decision function will be described in the case of user authentication through biometric authentication. FIGS. 4A and 4B are graphs related to an error rate of a biometric authentication determination.

Graph a in FIG. 4A is a graph showing a similarity distribution between the biometric information of a genuine user and the previously registered user information at the time of biometric authentication, and graph b in FIG. 4A is a graph showing a similarity distribution between the biometric information of an imposter user and the previously registered user information.

The graphs a and b have overlapping portions, and the electronic device 100 determines a user as a genuine user when having a similarity higher than a threshold value indicated by dotted line aa', and determines the user as an imposter user when having a similarity lower than the threshold value. Here, the threshold value may be a value determined by a provider providing a biometric authentication function, and denotes the above-described decision function.

On the other hand, a false rejection rate (FRR) illustrated in FIG. 4A indicates a rate determined to be an imposter user although the user is a genuine user. Since the higher the FRR is, the higher the threshold value, and thus a probability that the user who has entered biometric information is determined as a genuine user is decreased, the security of the biometric authentication may be enhanced. Since the lower the FRR is, the lower the threshold value, and thus a probability that the user who has entered biometric information is determined as a genuine user is increased, the security of the biometric authentication may be reduced.

A false acceptance rate (FAR) indicates an error rate determined to be a genuine user although the user is a genuine user. FAR is a concept contrary to FRR, and since the higher the FAR is, the lower the threshold value, and thus a probability that the user who has entered biometric information is determined as a genuine user is increased, the security of the biometric authentication may be reduced.

FIG. 4B is a graph showing a relationship between a FRR and a FAR. The FRR and the FAR may be inversely proportional to each other. A threshold value corresponding to region d having a high FRR and a low FAR may be used for applications requiring high security although having a low authentication speed. For example, a threshold value for this area may be set in a billing application, a banking application, which strictly determines a genuine user. On the contrary, a threshold value corresponding region c having a low FRR and a high FAR may be used for applications requiring low security although having a high authentication speed. For example, a threshold value corresponding to this region may be used for an unlock function or the like. The threshold value (i.e., decision function) of the biometric authentication function may be determined in consideration of a security level of functions to be executed through biometric authentication. Parameters related to an error at the time of biometric authentication have been described above.

Meanwhile, the present disclosure relates to a method for improving the authentication accuracy of a score fusion method of complex biometric authentication. Hereinafter, an algorithm that can be used in a score fusion method among complex biometric authentication methods will be described.

In the score fusion method, a variety of artificial intelligence algorithms that combine match scores may be used. A combination-based score fusion algorithm, a classifier-based score fusion algorithm, and a density-based score fusion algorithm may be used in an algorithm that can be used in the score fusion method.

The combination-based score fusion algorithm may include statical rules, dynamic weighting, triangular norms, and the like. The classifier-based score fusion algorithm may include support vector machine (SVM), AdaBoost (RS-ADA), and Dempster-Shafer (DS). The density-based score fusion algorithm may include a likelihood feature (LF).

In addition, various algorithms and the like known in a secure fusion method may be used in the present disclosure, and the detailed description thereof will be omitted in order not to depart from the spirit of the present disclosure.

The present disclosure relates to a method for improving the authentication accuracy of a score fusion method among complex biometric authentication methods in an electronic device capable of performing complex biometric authentication. Hereinafter, a biometric authentication method according to the present disclosure will be described in detail with reference to the drawings.

Figure 5:
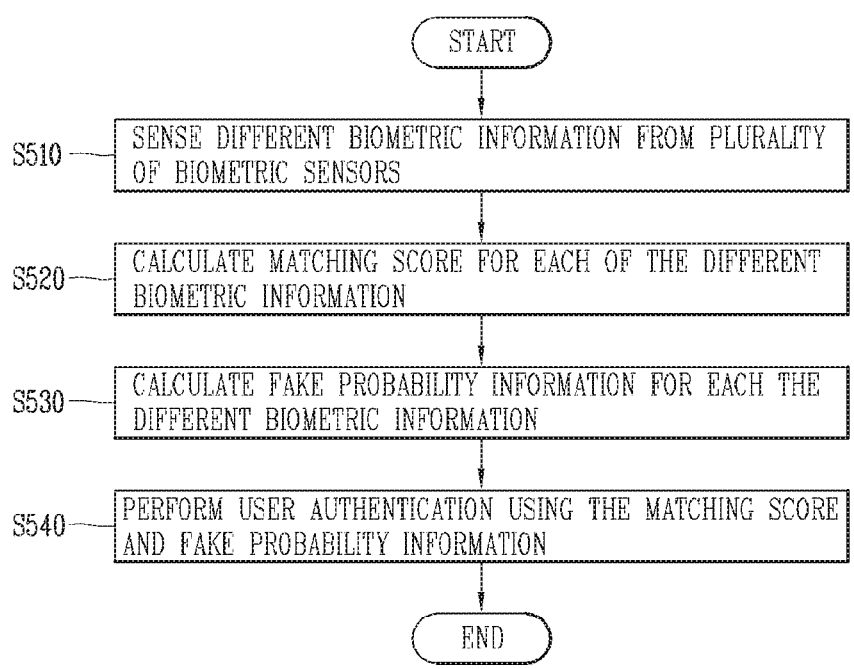
FIG. 5 is a conceptual view illustrating a method of performing user authentication through complex biometric authentication in an electronic device related to the present disclosure.
Figure 6:
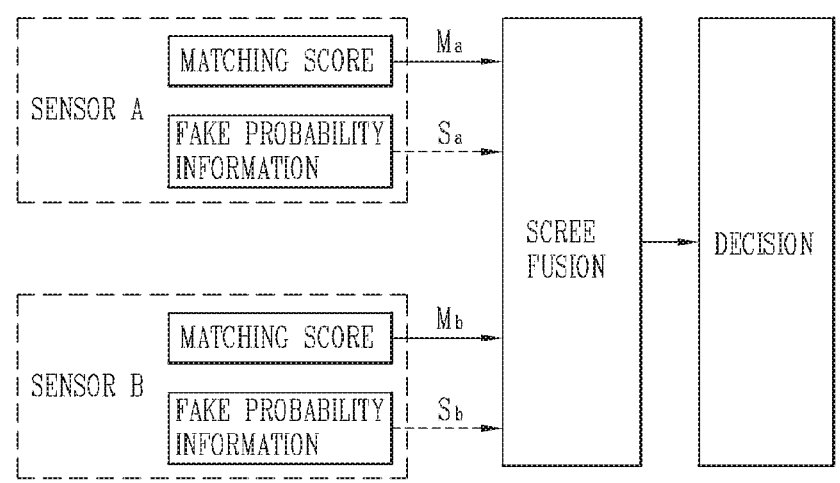
FIG. 6 is a block diagram for explaining complex biometric authentication in an electronic device related to the present disclosure.
Figure 7:
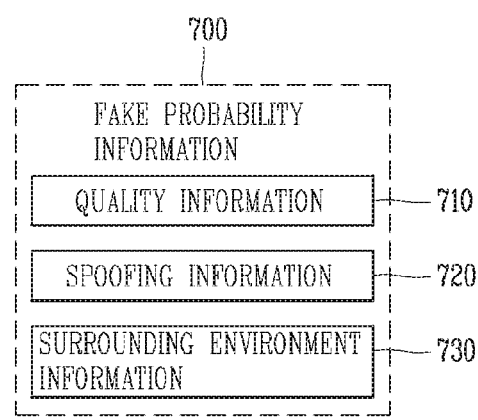
FIG. 7 is a block diagram for explaining a fake probability score for complex biometric authentication in an electronic device related to the present disclosure.

FIG. 5 is a conceptual view illustrating a method of performing user authentication through complex biometric authentication in an electronic device related to the present disclosure. FIG. 6 is a block diagram for explaining complex biometric authentication in an electronic device related to the present disclosure. FIG. 7 is a block diagram for explaining a fake probability score for complex biometric authentication in an electronic device related to the present disclosure.

The electronic device 100 according to the present disclosure may include a plurality of biometric sensors 143. The plurality of biometric sensors 143 may include various sensors described in FIG. 1. For example, the plurality of biometric sensors 143 may include a face image acquisition sensor (e.g., an image sensor), a voice sensor, an iris sensor, a fingerprint sensor, and the like.

Referring to FIG. 5, the security module 181 of the electronic device 100 may sense different biometric information from the plurality of biometric sensors 143 (S510).

The security module 181 may execute a biometric authentication function when a user request for biometric authentication is received or a preset condition is satisfied, or at preset intervals. Here, the preset condition may be various conditions such as a condition to receive a request for executing a security function, a condition in which the electronic device is located at a specific place (or a specific time), and the like.

In addition, when the biometric authentication function is executed at preset intervals, the security module 181 may execute the biometric authentication function in the background of the electronic device 100 to disallow the user to recognize that the biometric authentication function is being executed.

When the biometric authentication function is executed, the security module 181 may receive different biometric information from the plurality of biometric sensors 143. The different biometric information may include face recognition information, fingerprint recognition information, iris recognition information, voice recognition information, and the like.

The security module 181 may calculate a matching score for each of the different biometric information (S520).

The security module 181 may calculate a matching score for different biometric information through a comparison between previously registered user information and different biometric information. For example, referring to FIG. 6, the security module 181 may calculate a matching score Ma for biometric information acquired from sensor A and a matching score Mb for biometric information acquired from sensor B, respectively.

Furthermore, the security module 181 may calculate fake probability information for each of the different biometric information (S530).

The security module 181 may calculate fake probability information for each of the different biometric information in consideration of a fake method according to the unique characteristics of the different biometric information.

Here, the fake probability information is information indicating a possibility that the biometric information is fake information. The fake probability information may be calculated in consideration of a fake method depending on the unique characteristics of the biometric information. The unique characteristic of the biometric information denotes characteristics unique to each biometric information. For example, in the case of face recognition information, the positions of the eyes, nose, mouth and the like are unique characteristics. As for the fake method of the face recognition information, a photograph, a mask, or the like may be used. The fake probability information of the face recognition information may include characteristic information capable of distinguishing a photograph from a face of an actual person.

Therefore, the fake probability information may be different for each of the unique characteristics of the biometric information. As a result, the fake probability information may be a preset value prior to the execution of the biometric authentication function.

Referring to FIG. 7, the fake probability information 700 may include at least one of quality information 710, spoofing information 720, and surrounding environment information 730.

The quality information 710 indicates the quality of an attribute of the biometric information, which affects the accuracy of biometric authentication at the time of biometric authentication. For example, the quality information 710 may be the quality of an attribute such as resolution, image noise, blur, distortion, and the like.

The spoofing information 720 is information indicating a possibility that the biometric information is fake information. In other words, the spoofing information 720 denotes a probability that the currently sensed biometric information is fake information. For example, in the case of face authentication, it denotes a probability that the face recognition information has recognized a face photograph other than a face of a person. The spoofing information 720 may include motion detection, eye blink detection, reflectivity information of a 2D image, thermal image information, heart rate information, frequency spectrum information, and audio and video synchronization information, and the like.

The spoofing information 720 may be generated using sensor information received from an additional sensor as well as biometric information. For example, the spoofing information of the face recognition information may be generated by detecting and using eye blinking (or facial movement) through a comparison between a plurality of face images photographed through the camera 121. For another example, the spoofing information of the fingerprint identification information may be generated using heart rate information detected through the heart rate sensor.

The surrounding environment information 730 is environmental information that affects biometric authentication. In other words, the surrounding environment information 730 is environment information at the time of sensing the biometric information. For example, the surrounding environment information 730 may include ambient illumination, ambient noise, a vibration of the electronic device, and the like.

The surrounding environment information 730 may be sensed through an additional environmental sensor or generated using an attribute of the biometric information itself. Here, the environmental sensor includes an illuminance sensor, a temperature sensor, a noise sensor, an acceleration sensor, a gyro sensor, and the like, and additionally, may include various sensors described in FIG. 1. Through these sensors, the surrounding environment information may be detected.

The surrounding environment information may also be set differently according to the unique characteristics of the biometric information. For example, in the case of face recognition, illuminance is set as surrounding environment information affecting the face recognition, and in the case of fingerprint recognition, surrounding environment information affecting the fingerprint recognition is set as a degree of vibration of the device mounted with a fingerprint sensor. Through this, according to the present disclosure, surrounding environment information that affects the sensing of biometric information may be taken into consideration, thereby enhancing the accuracy of complex biometric authentication.

The following table shows an example of fake probability information for each of the biometric authentication methods. In addition, various biometric authentication methods may be used, and in this case, fake probability information may be generated in a manner described above.

|  | Face authentication | Fingerprint authentication | Voice authentication |
|---|---|---|---|
| Quality information | Resolution<br>Noise<br>Blur | Resolution<br>Noise<br>Blur | Noise<br>Distortion |
| Spoofing information | Motion detection,<br>Eye blink detection,<br>Reflectance using multispectral lighting in 2D images,<br>Thermal images,<br>Face motion + background motion | Local patch detection,<br>Local phase quantization,<br>Weber local descriptor,<br>Thermal detection,<br>Heart beat detection | Spectral analysis |
| Surrounding environment information | Light intensity | Motion | Noise level |

The generated matching information and fake probability information may be stored in the memory 170.

Referring again to FIG. 5, the security module 181 may perform user authentication using matching score and fake probability information calculated for each different biometric information (S540).

The security module 181 may calculate a final score using the matching score and the fake probability score generated for each different biometric information.

At this time, the final score may be generated based on an algorithm used in the score fusion method. As described above, conventionally known methods may be used for an algorithm of the score fusion method, and the detailed description thereof will be omitted in order not to obscure the spirit of the present disclosure.

For example, referring to FIG. 6, the security module 181 may calculate a final score using matching score Ma and fake probability information Sa calculated by sensor A, and matching score Mb and fake probability information Sb calculated by sensor B.

Then, the security module 181 may perform user authentication through a comparison between the generated final score and a preset decision function. More specifically, when the final score is greater than a threshold value of a preset decision function, the security module 181 may determine that the user who entered biometric information is a genuine user. This situation may be referred to as successful user authentication. More specifically, when the final score is less than a threshold value of a preset decision function, the security module 181 may determine that the user who entered biometric information is an imposter user. This situation may be referred to as failed user authentication.

The preset decision function may be set differently depending on the type of fake probability information considered when calculating the final score. For example, when only the matching score and the spoofing information are used during the calculation of the final score, the controller 180 may use a decision function generated using the matching score and the spoofing score.

Furthermore, when it is difficult to acquire a fake probability score due to the unique characteristics of the biometric sensor, the security module 181 may perform a score fusion method only using the matching score. In addition, the security module 181 may use the score fusion method by selectively using only some information according to the characteristics of biometric information among various information included in fake probability information. It may be determined by the unique characteristics of the currently acquired biometric information.

On the other hand, although not shown, the controller 180 may receive a user authentication result from the security module 181 and control an operation of the electronic device based on the received data. The user authentication result is a user authentication success or a user authentication failure. For example, when a user authentication success result is received, the controller 180 may proceed with a payment requested by a payment application. On the contrary, when a user authentication failure result is received, the controller 180 may not proceed with a payment requested by the payment application.

On the other hand, in the foregoing description, it has been described a case where the user authentication is carried out using the matching score and the fake probability information, but the present disclosure is not limited to this, and the user authentication may be carried out using only the matching score. In this case, the fake probability information may not be generated.

In the above, a method of performing user authentication using the matching score and the fake probability information when performing complex biometric authentication in the electronic device according to the present disclosure has been described. Through this, the present disclosure may calculate the matching score and the fake probability information for each of the plurality of biometric information at the time of complex biometric authentication, and perform user authentication using the information, thereby improving the authentication accuracy of the complex biometric authentication.

In addition, the electronic device according to the present disclosure may generate fake probability information in consideration of the surrounding environment information of the electronic device performing biometric authentication to perform biometric authentication in consideration of a situation that the accuracy of the biometric authentication is reduced due to the influence of the surrounding environment.

Figure 8:
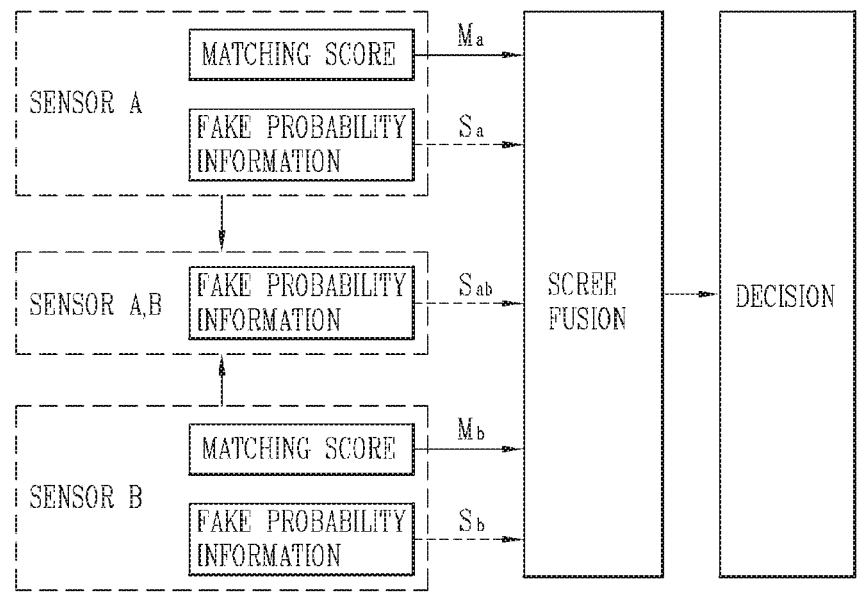
FIG. 8 is a block diagram for explaining the use of sensor fusion information in an electronic device related to the present disclosure.
Figure 9:
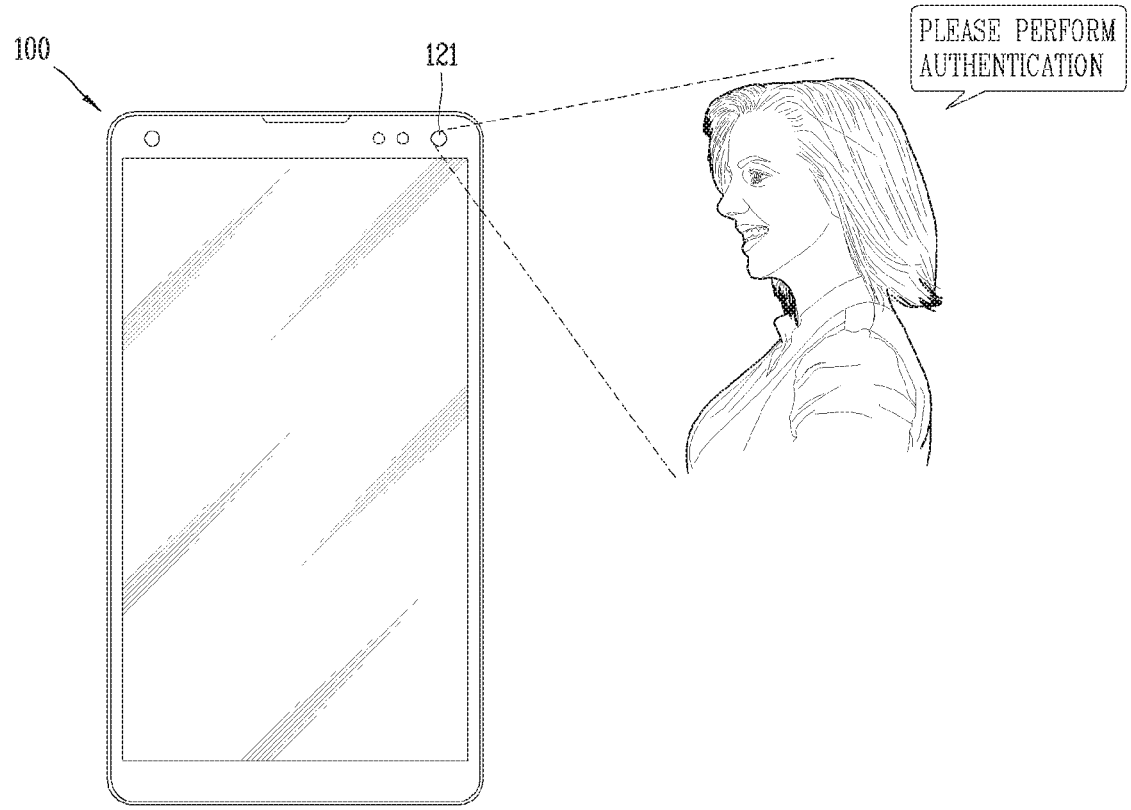
FIG. 9 is a conceptual view for explaining an embodiment that utilizes the sensor fusion information in FIG. 8.

Hereinafter, a method of performing user authentication using sensor combination information in an electronic device related to the present disclosure will be described. FIG. 8 is a block diagram for explaining the use of sensor combination information in the electronic device related to the present disclosure. FIG. 9 is a conceptual view for explaining an embodiment that utilizes the sensor combination information in FIG. 8.

In the foregoing description, a method of performing complex biometric authentication using the matching score and the fake probability information of the information collected by each sensor has been described. Meanwhile, the security module 181 may combine biometric information acquired from different sensors and further calculate fake probability information on the combined biometric information.

More specifically, referring to FIG. 8, the security module 181 may combine biometric information acquired from the sensors A and B with each other. At this time, the security module 181 may generate combination information that are combined with information in consideration of a correlation between the biometric information acquired from the sensors.

For example, referring to FIG. 9, the security module 181 may acquire face recognition information and voice recognition information to generate combination information through a combination between the acquired biometric information. Specifically, the security module 181 may extract a mouth-shaped movement from the face recognition information, and generate synchronization information regarding whether or not synchronization between the extracted mouth-shaped movement, voice utterance timing, and pronunciation information is correct.

The security module 181 may calculate fake probability information for the combined information. For example, the fake probability information may include the synchronization information, resolution, noise, illumination, and ambient noise.

The security module 181 may calculate a final score using the matching score Ma, fake probability score Sa of the sensor A, the matching score Mb, fake probability score Sb of the sensor B, and the fake probability score Sab of the sensor AB.

Meanwhile, although not shown, the security module 181 may calculate a matching score for the sensor combination information through a comparison between the sensor combination information and the previously registered user information. At this time, the security module 181 may consider the matching score of the sensor combination information when calculating the final score.

In the above, a method of performing complex biometric authentication using sensor combination information has been described. Through this, the present disclosure may improve the authentication accuracy of biometric authentication using sensor combination information.

Figure 10:
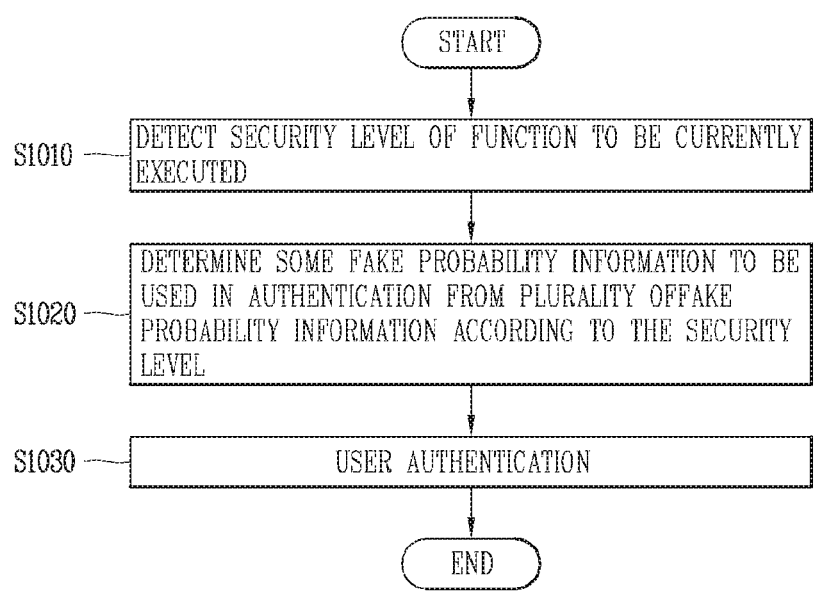
FIG. 10 is a flowchart illustrating a method of performing complex biometric authentication according to the security level of an application.

Hereinafter, a method for varying fake probability information considered in a score fusion method of complex biometric authentication according to a security level of an application at which an execution request is received will be described. FIG. 10 is a flowchart illustrating a method of performing complex biometric authentication according to the security level of an application.

In the foregoing description, a method of utilizing fake probability information for complex biometric authentication in the electronic device 100 according to the present disclosure has been described. On the other hand, there are FRR and FAR as parameters for determining the performance of complex biometric authentication. Since FRR and FAR have a trade-off relationship with each other, when one level increases, the other level may decrease.

The security module 181 of the electronic device 100 according to the present disclosure may perform biometric authentication using only some of the fake probability information in consideration of FRR and FAR according to the security level of the application. Alternatively, the security module 181 may set weights between a plurality of information included in the fake probability information to be different and reflect them in the final score calculation.

FIG. 10 is a flowchart showing such a control method. Referring to FIG. 10, the security module 181 may detect a security level of a function to be executed at present (S1010).

When a user request for the execution of a specific function is received, the controller 180 may detect the security level of the specific function. The controller 180 may transmit the detected security level to the security module 181.

The security module 181 may determine some fake probability information to be used for authentication among a plurality of fake probability information according to the security level (S1020).

Specifically, the FRR may vary greatly according to the surrounding environment information, and the FAR may vary greatly according to the spoofing information. Accordingly, the security module 181 may perform biometric authentication in consideration of only the spoofing information so that the FAR can reach a low level when the security level of the application is high (when the security level is greater than a reference level). Accordingly, the security module 181 may perform biometric authentication in consideration of only the surrounding environment information so that the FRR can reach a low level when the security level of the application is low (when the security level is less than a reference level).

The security module 181 may perform user authentication using the determined some fake probability information according to the security level (S1030). Accordingly, the security module 181 may perform user authentication using some fake probability information, thereby performing appropriate security authentication for each application.

The electronic device according to the present disclosure may calculate the matching score and the fake probability information for each of the plurality of biometric information at the time of complex biometric authentication, and perform user authentication using the information, thereby improving the authentication accuracy of the complex biometric authentication.

In addition, the electronic device according to the present disclosure may generate fake probability information in consideration of the surrounding environment information of the electronic device performing biometric authentication to perform biometric authentication in consideration of a situation that the accuracy of the biometric authentication is reduced due to the influence of the surrounding environment.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. An electronic device configured to perform biometric authentication, the device comprising:
 a memory configured to store information;
 a plurality of biometric sensors configured to receive biometric information; and
 one or more controllers configured to:
 receive context information from at least one of the plurality of biometric sensors;
 determine a spoof probability of biometric information received from each of the plurality of biometric sensors, wherein the spoof probability is determined based on one or more of the received context information;
 determine a degree of quality of the received biometric information received from each of the plurality of biometric sensors, wherein the determined degree of quality varies based on one or more of the received context information on the received biometric information;
 determine a first match degree between a first preset user biometric information stored in the memory and a first biometric information received from a first biometric sensor of the plurality of biometric sensors;
 determine a second match degree between a second preset user biometric information stored in the memory and a second biometric information received from a second biometric sensor of the plurality of biometric sensors;
 perform authentication of a user based on a final matching score calculated from the first match degree, the second match degree, the spoof probability, and the degree of quality, wherein selecting a set of the spoof probability and the degree of quality information among a plurality of fake probability information based upon a different security level of functions to be executed through the biometric authentication; and
 control the electronic device based on the authentication.

2. The electronic device of claim 1, wherein the authentication comprises:
 generating a composite authentication value based on the first match degree, the second match degree, the spoof probability, the degree of quality; and
 determining whether the generated composite authentication value meets a preset threshold authentication value.

3. The electronic device of claim 2, wherein the authentication further comprises determining whether the spoof probability meets a spoof threshold to perform the authentication and whether the degree of quality meets a quality threshold.

4. The electronic device of claim 1, wherein the authentication comprises determining whether the first match degree meets a first match threshold and whether the second match degree meets a second match threshold.

5. The electronic device of claim 4, wherein the first match threshold is varied based on one of the contextual information.

6. The electronic device of claim 5, wherein:
 the first biometric information is facial information of a user;
 the one of the contextual information is a movement amount of the electronic device when the facial information is received from the first sensor; and
 an increase in the movement amount corresponds to lower first match threshold.

7. The electronic device of claim 1, wherein the determined spoof probability comprises:

a first spoof probability of the first biometric information received from the first sensor determined based on a first context information of the one or more context information; and
 a second spoof probability of the second biometric information received from the second sensor determined based on a second context information of the one or more context information.

8. The electronic device of claim 7, wherein the one or more context information comprises a reflection amount detected within a face image, an electronic voice reproduction level, or a detected skin temperature associated with a received fingerprint.

9. The electronic device of claim 1, wherein the determined degree of quality comprises:
 a first degree of quality of the first biometric information received from the first sensor varied based on a first context information of the one or more context information; and
 a second degree of quality of the second biometric information received from the second sensor varied based on a second context information of the one or more context information.

10. The electronic device of claim 9, wherein:
 the first biometric information comprises detected facial information; and
 the first context information comprises a movement amount of the electronic device when the facial information is detected.

11. The electronic device of claim 10, wherein:
 the second biometric information comprises detected fingerprint information; and
 the second context information comprises a movement amount of the electronic device when the fingerprint information is detected.

12. The electronic device of claim 10, wherein:
 the second biometric information comprises detected voice information; and
 the second context information comprises a background noise level detected at the electronic device when the voice information is detected.

13. An electronic device configured to perform biometric authentication, the device comprising:
 a memory configured to store information;
 a plurality of biometric sensors configured to receive biometric information; and
 one or more controllers configured to: obtain context information from at least one of the plurality of biometric sensors;
 obtain a spoof probability of biometric information received from each of the plurality of biometric sensors, wherein the spoof probability is determined based on one or more of the received context information;
 obtain a degree of quality of the received biometric information received from each of the plurality of biometric sensors, wherein the degree of quality varies based on one or more of the received context information on the received biometric information;
 obtain a first match degree between a first preset user biometric information stored in the memory and a first biometric information received from a first biometric sensor of the plurality of biometric sensors;
 obtain a second match degree between a second preset user biometric information stored in the memory and a second biometric information received from a second biometric sensor of the plurality of biometric sensors;

obtain results of authentication of a user based on a final matching score calculated from the first match degree, the second match degree, the spoof probability, and the degree of quality, wherein selecting a set of the spoof probability and the degree of quality information among a plurality of fake probability information based upon a different security level of functions to be executed through the biometric authentication; and control the electronic device based on the authentication results.

14. The electronic device of claim 13, wherein the authentication comprises:

obtaining a composite authentication value based on the first match degree, the second match degree, the spoof probability, the degree of quality, wherein the authentication result is successful when the generated composite authentication value meets a preset threshold authentication value.

15. The electronic device of claim 14, wherein the authentication further comprises determining whether the spoof probability meets a spoof threshold and whether the degree of quality meets a quality threshold.

16. The electronic device of claim 13, wherein the authentication comprises determining whether the first match degree meets a first match threshold and whether the second match degree meets a second match threshold.

17. The electronic device of claim 16, wherein the first match threshold is varied based on one of the contextual information.

18. The electronic device of claim 17, wherein:

the first biometric information is facial information of a user;

the one of the contextual information is a movement amount of the electronic device when the facial information is received; and an increase in the movement amount corresponds to lower first match threshold.

19. The electronic device of claim 13, wherein the determined spoof probability comprises:

a first spoof probability of the first biometric information received from the first sensor determined based on a first context information of the one or more context information; and a second spoof probability of the second biometric information received from the second sensor determined based on a second context information of the one or more context information.

20. The electronic device of claim 19, wherein the one or more context information comprises a reflection amount detected within a face image, an electronic voice reproduction level, or a detected skin temperature associated with a received fingerprint.

21. The electronic device of claim 13, wherein the determined degree of quality comprises:

a first degree of quality of the first biometric information received from the first sensor varied based on a first context information of the one or more context information; and a second degree of quality of the second biometric information received from the second sensor varied based on a second context information of the one or more context information.

22. The electronic device of claim 21 wherein:

the first biometric information comprises detected facial information; and the first context information comprises a movement amount of the electronic device when the facial information is detected.

23. The electronic device of claim 22, wherein:

the second biometric information comprises detected fingerprint information; and the second context information comprises a movement amount of the electronic device when the fingerprint information is detected.

24. The electronic device of claim 22, wherein:

the second biometric information comprises detected voice information; and the second context information comprises a background noise level detected at the electronic device when the voice information is detected.

25. A method of performing biometric authentication at an electronic device, the method comprising:

obtaining biometric information from a plurality of biometric sensors at the electronic device;

obtaining context information from at least one of the plurality of biometric sensors;

obtaining a spoof probability of biometric information received from each of the plurality of biometric sensors, wherein the spoof probability is determined based on one or more of the received context information;

obtaining a degree of quality of the received biometric information received from each of the plurality of biometric sensors, wherein the degree of quality varies based on one or more of the received context information on the received biometric information;

obtaining a first match degree between a first preset user biometric information stored in a memory at the electronic device and a first biometric information received from a first biometric sensor of the plurality of biometric sensors;

obtaining a second match degree between a second preset user biometric information stored in the memory and a second biometric information received from a second biometric sensor of the plurality of biometric sensors;

obtaining results of authentication of a user based on a final matching score calculated from the first match degree, the second match degree, the spoof probability, and the degree of quality, wherein selecting a set of the spoof probability and the degree of quality information among a plurality of fake probability information based upon a different security level of functions to be executed through the biometric authentication; and controlling the electronic device based on the authentication results.

* * * * *